United States Patent
Hosie et al.

(10) Patent No.: US 10,601,871 B2
(45) Date of Patent: Mar. 24, 2020

(54) RECONFIGURATION OF SECURITY REQUIREMENTS FOR DEPLOYED COMPONENTS OF APPLICATIONS

(71) Applicant: International Business Machines Corporation, Armonk, NY (US)

(72) Inventors: John Hosie, Hampshire (GB); Martin A. Ross, Hampshire (GB); Craig H. Stirling, Hampshire (GB); Dominic J. Storey, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 15/409,123

(22) Filed: Jan. 18, 2017

(65) Prior Publication Data
US 2018/0205759 A1      Jul. 19, 2018

(51) Int. Cl.
G06F 8/65        (2018.01)
H04L 29/06      (2006.01)
H04L 29/08      (2006.01)

(52) U.S. Cl.
CPC ............. H04L 63/20 (2013.01); G06F 8/65 (2013.01); H04L 67/10 (2013.01)

(58) Field of Classification Search
CPC ........... H04L 63/20; H04L 67/10; G06F 8/65
(Continued)

(56) References Cited

U.S. PATENT DOCUMENTS 8,241,989 B2   8/2012   Hofmann et al.
8,434,080 B2   4/2013   Yendluri
(Continued)

FOREIGN PATENT DOCUMENTS

WO   WO2013184140   12/2013

OTHER PUBLICATIONS

Mead et al, "Security Quality Requirements Engineering (SQUARE) Methodology", [Online], 2005, pp. 1-7, [Retrieved from Internet on Nov. 1, 2019], <http://delivery.acm.org/10.1145/1090000/1083214/p14-mead.pdf> (Year: 2005).*
(Continued)

Primary Examiner — Ziaul A Chowdhury
Assistant Examiner — Zengpu Wei
(74) Attorney, Agent, or Firm — Schmeiser, Olsen & Watts, LLP; Brian Restauro

(57) ABSTRACT

Method and system are provided for reconfiguration of security requirements for deployed components of applications. The method includes referencing a deployed application wherein the application is divided into processing components, which can be deployed in different locations. The method adds one or more application resources for the deployed application to a central repository with references to the processing components of the deployed application utilizing the resources. The method further involves: receiving an update to an application resource to modify a security requirement for the resource; checking the deployment locations of the processing components of deployed applications referenced to the updated application resource to ensure the processing components conform to the modified security requirement; and taking an action for each referenced processing component of the deployed application that does not conform to the modified security requirement.

13 Claims, 10 Drawing Sheets

(58) Field of Classification Search
USPC .................................................. 717/172
See application file for complete search history.

(56) References Cited

U.S. PATENT DOCUMENTS

| | | |
|---|---|---|
| 9,398,087 B1 | 7/2016 | Hosie et al. |
| 2006/0037062 A1* | 2/2006 | Araujo ............... H04L 63/104 726/2 |
| 2006/0123018 A1* | 6/2006 | Ashok ................. G06F 8/61 |
| 2007/0074203 A1* | 3/2007 | Curtis ................. G06F 8/65 717/174 |
| 2010/0005505 A1* | 1/2010 | Gottimukkala ....... H04L 41/082 726/1 |
| 2010/0123202 A1 | 5/2010 | Hofmann et al. |
| 2010/0333060 A1* | 12/2010 | Kirchgaessner .......... G06F 8/10 717/102 |
| 2012/0174058 A1 | 7/2012 | Winkler et al. |
| 2012/0185913 A1* | 7/2012 | Martinez ............... G06F 9/455 726/1 |
| 2013/0191539 A1* | 7/2013 | Sailer ................. H04L 67/34 709/225 |
| 2013/0291052 A1* | 10/2013 | Hadar ................ G06F 21/6218 726/1 |
| 2014/0053226 A1* | 2/2014 | Fadida ................ H04L 67/34 726/1 |
| 2014/0229939 A1* | 8/2014 | Dias de Assuncao .... G06F 8/63 718/1 |
| 2015/0074278 A1 | 3/2015 | Maes et al. |
| 2015/0081883 A1* | 3/2015 | Katz ................... H04L 47/785 709/224 |
| 2015/0096011 A1* | 4/2015 | Watt .................. H04L 63/0272 726/15 |
| 2016/0357718 A1* | 12/2016 | Gelfand ............. G06F 17/2264 |
| 2018/0083924 A1 | 3/2018 | Hosie et al. |

OTHER PUBLICATIONS

Saleh et al, "The Security Requirements Behavior Model for Trustworthy Software", [Online], 2008, pp. 235-238, [Retrieved from Internet on Nov. 1, 2019], <https://ieeexplore.ieee.org/stamp/stamp.jsp?tp=&arnumber=4483436> (Year: 2008).*

Devanbu et al, "Software Engineering for Security: a Roadmap", [Online], 2000, pp. 225-239, [Retrieved from Internet on Nov. 1, 2019], <http://delivery.acm.org/10.1145/340000/336559/p227-devanbu.pdf> (Year: 2000).*

U.S. Appl. No. 15/271,378, filed Sep. 21, 2016.

Duran et al., Robust Configuration of Cloud Applications, http://convecs.inria.fr/doc/publications/Duran-Salaun-14.pdf. Captured Oct. 6, 2016, 6 pages.

* cited by examiner

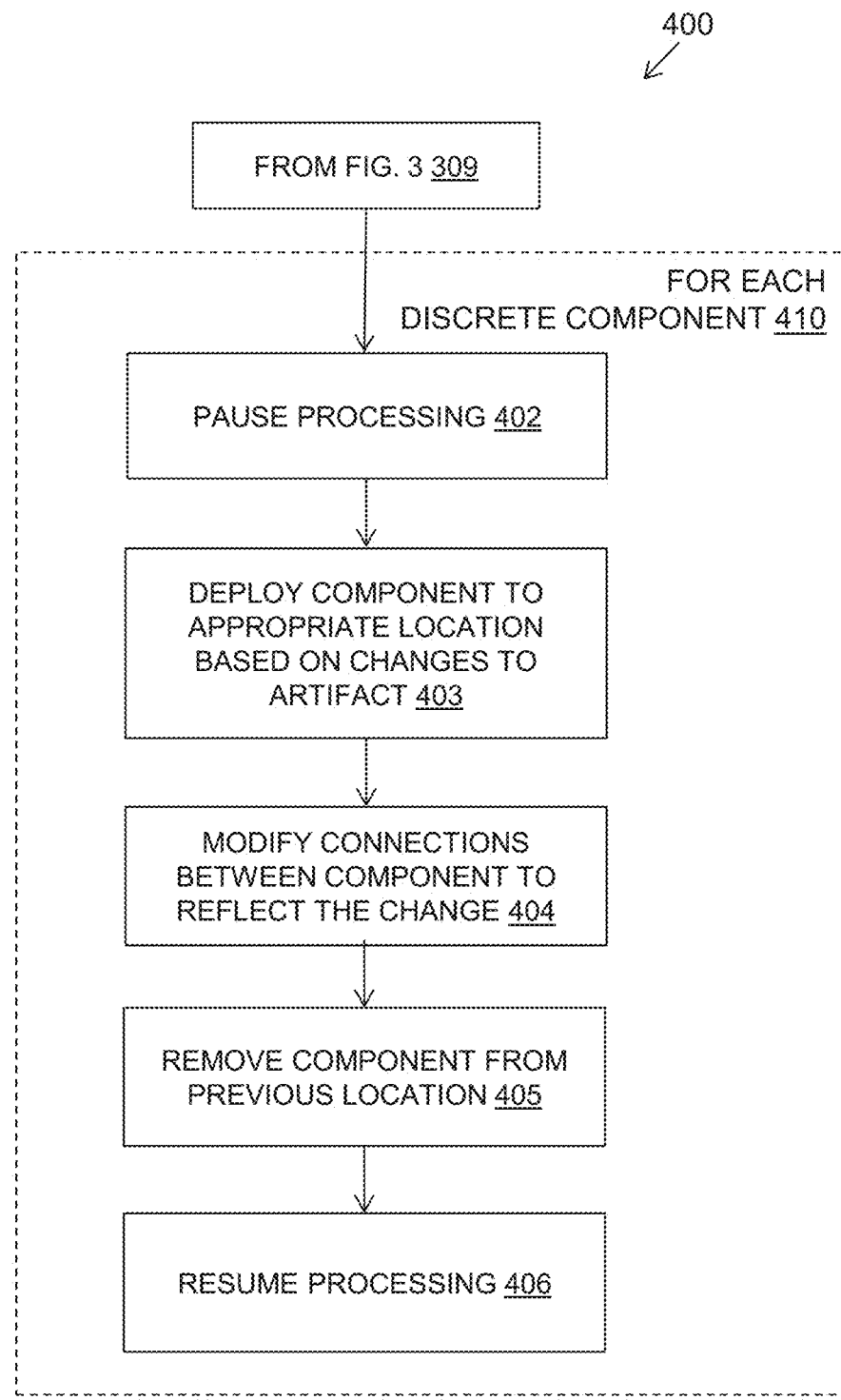

RECONFIGURATION OF SECURITY REQUIREMENTS FOR DEPLOYED COMPONENTS OF APPLICATIONS

TECHNICAL FIELD

The present invention relates to security requirements for deployed components of applications, and more specifically, to enabling reconfiguration of the security requirements.

BACKGROUND

Products such as IBM® Integration Bus provide options for a universal integration foundation based on enterprise service bus (ESB) technology. Implementations help to enable connectivity and transformation in heterogeneous information technology environments for businesses of any size, in any industry and covering a range of platforms including cloud environments and mainframe servers.

Certain integration flows may be performing actions on messages containing sensitive data, which is likely to have restrictions associated with where the sensitive data can flow. For instance, certain data may need to stay within the company firewall or not be allowed to go out of the country.

SUMMARY

An embodiment of the present invention relates to a method and associated computer system and computer program product for reconfiguring security requirements for deployed components of applications. A processor of a computer system references a deployed application wherein the deployed application is divided into processing components which can be deployed in different locations. One or more application resources for the deployed application are added to a central repository with references to the processing components of the deployed application utilizing the one or more application resources. An update to an application resource to modify a security requirement for the application resource is received. The deployment locations of the processing components of the deployed application referenced to the updated application resource are checked to ensure the deployed application conforms to the modified security requirement. An action is taken for each referenced processing component of the deployed application that does not conform to the modified security requirement.

BRIEF DESCRIPTION OF THE DRAWINGS

FIG. 4 depicts a flow diagram of an aspect of a method, in accordance with embodiments of the present invention.

DETAILED DESCRIPTION

Figure 1:
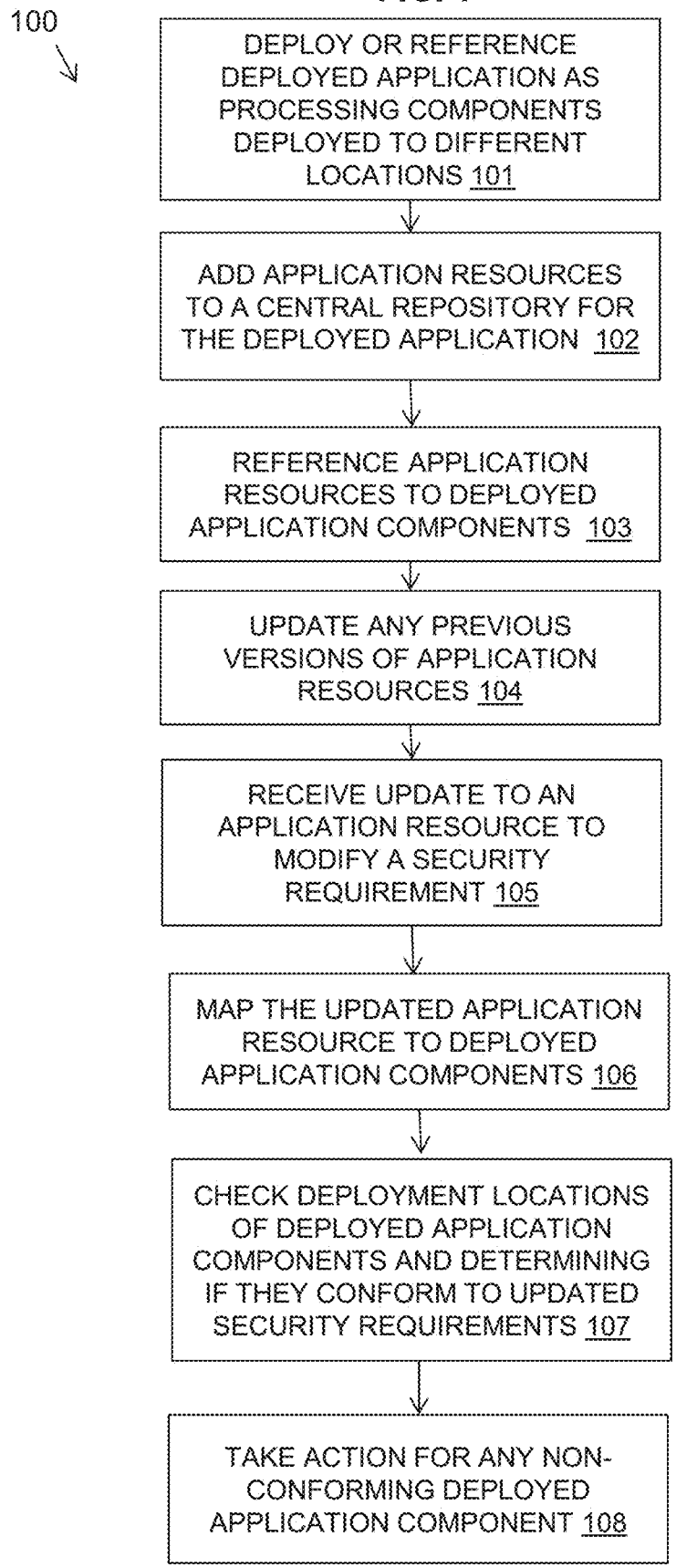
FIG. 1 depicts a flow diagram of a method, in accordance with embodiments of the present invention.

Utilizing cloud technologies enables companies to scale elastically to cope with demand, reduce and rationalize information technology infrastructure, reduce cost of operations and deploy systems faster, easier and on-demand.

Certain end-to-end integration applications or services may be running in hybrid cloud environments where some processing is performed in a public cloud space and some processing that may be using secure data is run on-premise within the company firewall.

Secure connectors are known which connect to systems that are behind a firewall. For systems such as databases, secure connectors are required to run the integration. This enables an integration application running in a public cloud space to connect to an application running on-premise behind a company firewall.

The described method and system provides that an application with processing components that are capable of being deployed to different locations stores application resources in a central repository. Any security changes made to any of application resources may then be related to deployed components of the application that may be notified and updated appropriately, which provides an easily used redeployment or reconfiguration method for modifying an existing distributed deployment of an application, for example, in a hybrid cloud environment to meet updated security requirements.

The stored application resources may be mapped or referenced to processing components of deployed applications. A processing component may be a portion of discrete logic of an application deployable to a location. Alternatively or additionally, the application resources may be mapped or referenced to entire deployed applications.

The stored application resources may be in the form of interface artifacts, which may be artifacts associated with any of the interfaces of the application. The interface artifacts may include: schemas, message models, interface documents, such as Swagger or OpenAPI defining a Representational State Transfer (REST) endpoint, Web Service Definition Language (WSDL) defining a Simple Object Access Protocol (SOAP) endpoint, or application specific policy documents that provide configuration options depending on the application and implementation.

A message may describe the structure and content of a set of data that is exchanged between interfaces of application components that send and receive data. A message model may define data aspects, such as entire messages, data fields, data elements, types or data structures of messages.

Information may be required to flow between disparate applications across multiple hardware and software platforms. One architecture which supports the flow of information between disparate applications across multiple hardware and software platforms is Enterprise Service Bus architecture providing integrated connectivity between applications and services in a service-oriented architecture. IBM® Integration Bus is an example of such an architecture, which allows business information to flow as an integration application with rules applied to the data flowing through an integration node, also referred to as a message broker, to route and transform the information.

Other architectures may include network distributed computing in which a distributed system is a software system in which components are located on networked computers and communicate and coordinate component actions by passing messages. Distributed applications may be processed across a distributed computing architecture.

The described method and system are described in more detail in the field of integration flows or applications, which may be deployed across different locations including using a hybrid cloud environment. However, equivalent methods and systems may be applied to a distributed computing environment. The term "distributed application" is used to encompass applications distributed across different deployment locations including integration applications and network distributed applications.

Referring now to the drawings, FIG. 1 is a flow diagram 100 of a method, in accordance with embodiments of the present invention.

An application may be deployed or a deployed application may be referenced, as shown in step 101, and with discrete processing components deployed to different locations. In one embodiment, a distributed integration application is deployed in a hybrid cloud environment with some processing components distributed to the cloud and some processed on-premise within a company firewall for security purposes. The application logic may be analyzed and appropriate deployment locations chosen for the discrete processing components.

In step 102, at or after deployment, one or more application resources for the deployed application may be added to a central repository with step 103 referencing to processing components of the deployed application utilizing the resources. The referencing in step 103 may be to individual discrete processing components of the application, which may provide management of the individual processing components of an application; alternatively or additionally, the referencing may be to the deployed application as a whole.

The application resources may include interface artifacts. In one example, an interface artifact may be a message model for the application relating to the data transferred by messages in the distributed integration application.

The application resources may include annotations or metadata relating to deployment restraints for the application resources, which may be used during deployment of the application. The annotations are optional and the application resources may be stored with no annotations and may be updated at a later stage to include annotations.

Deployed application information may also be added to the central repository in association with the processing components. This may include the deployed location of each processing component of the application.

Referencing processing components at the application resources of the central repository in step 103 may include mapping application resources to each deployed processing component of multiple deployed applications, which may use the same application resources. Alternatively or additionally, the referencing in step 103 may be to multiple deployed applications that use the same application resources.

When adding application resources to a central repository for a newly deployed application, any previous versions of the application resource already in the central repository may be updated in step 104 and any deployed processing components or deployed applications referencing the previous versions updated.

An update may be received in step 105 to an application resource to modify a security requirement for the resource. For example, an application resource may have the application resource's security requirements tightened or relaxed.

An updated application resource may be mapped in step 106 in the central repository to the referenced deployed application processing components and/or deployed applications that utilize the application resource.

The deployment location of each of the deployed application processing components referenced to the updated application resource may be checked in step 107 to ensure the deployed application components conform to the modified security requirement.

Checking the deployed location may check any deployed application information stored in the central repository to understand whether the current deployment location meets the modified security requirements or whether action needs to be taken. In other implementations, the checking may utilize external checks to determine the deployed locations.

Appropriate action may be taken in step 108 for each deployed application processing component of for entire deployed applications that do not conform to the modified security requirement of the application resource.

In one embodiment, the application resources may be referenced to individual processing components of deployed applications, which may provide finer grain management of individual processing components of deployed applications.

In another embodiment, the application resources may be referenced to an entire deployed application and the entire application may be redeployed, if required by an updated security requirement to an application resource, rather than just acting on individual processing components.

In a further embodiment, the application resources may reference both individual processing components and the entire distributed application in order to retrieve metadata associated with the distributed application itself, for example, metadata relating to actions allowed for processing components of the application (i.e. if the application components are permitted to have the application component's deployment auto updated) and to the individual processing component to understand the associated interfaces and deployment location.

The action taken may take various forms. It may update the deployment location of the processing component including stopping an operation of the processing component in the non-conforming location. Alternatively, a notification of non-conformity may be issued and the operation of the deployed processing component that no longer conforms may be stopped. An entire application may be stopped or redeployed if the application resources reference the entire application.

Storing application resources separately in a central repository with references to those components of distributed applications that utilize the resources enables a central update to application resources across a plurality of distributed application utilizing the resource. Upon an update to a resource to modify security requirements, such as marking a field in a schema or interface as confidential, the deployment location of the referenced components of the distributed applications may be checked to ensure the referenced components still conforms to the security requirements on the data the referenced components are processing.

Automatic reconfiguration of an already deployed instance of a distributed application is provided when associated resources are updated in a central repository to modify security constraints on data aspects. Thus, separating the resources and keeping track of the resources' relationships enables deployed applications to be analyzed and updated when a resource in the central repository is updated.

Figure 2:
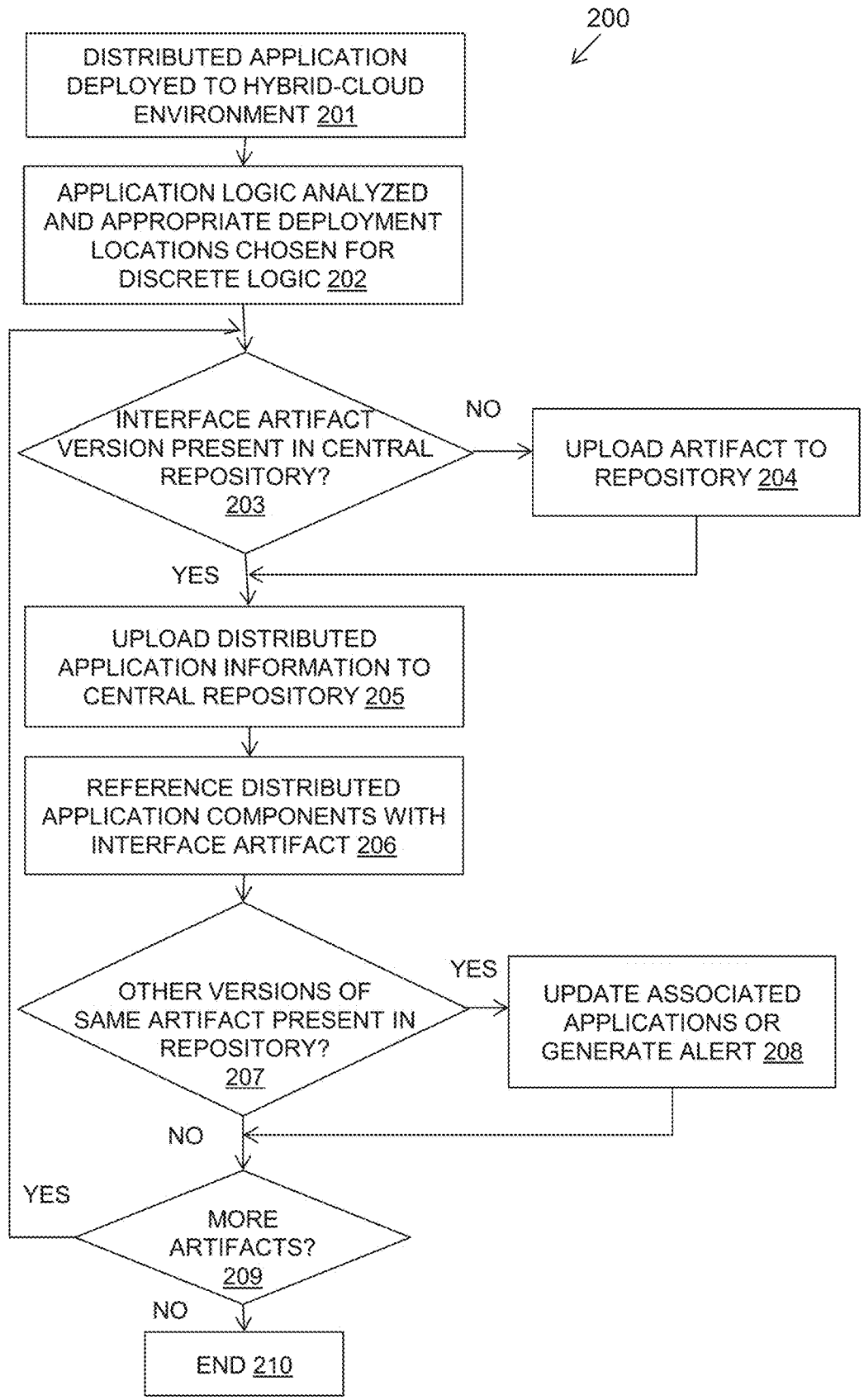
FIG. 2 depicts a flow diagram of an aspect of a method, in accordance with embodiments of the present invention.

FIG. 2 depicts a flow diagram 200 of an aspect of a method, in accordance with embodiments of the present invention. Flow diagram 200 shows an example embodiment of an aspect of the described method of storing application resources in the form of interface artifacts of a distributed integration application in a central repository. The example embodiment is provided for hybrid-cloud integrations as there are security implications of data transferring between on-premise and cloud systems that are hosted elsewhere.

In this embodiment, a distributed integration application may be deployed in step 201 to a hybrid cloud environment based on annotations in utilized message models and the usage of the message models within the integration. Upon deployment, the application may be analyzed in step 202 and appropriate deployment locations chosen for components of discrete logic of the application, including deployment to on-premise, public cloud, or both environments. The analysis may use message models for the application, which may have security requirements annotated to aspects of the message model.

Application resources, such as interface artifacts in the form of message models, utilized by the deployed integration application may be uploaded to a central repository of application resources.

For each interface artifact of the distributed integration application, it may be determined in step 203 if the interface artifact version is already present in the central repository. If interface artifact version is not already present, the method may upload in step 204 the interface artifact version to the central repository.

If the interface artifact version is already in the central repository or once the interface artifact version is uploaded in step 204, the distributed integration application information may be uploaded in step 205 to the central repository and the discrete processing components of the application may be referenced in step 206 to the interface artifact.

It may be determined in step 207 if there are other earlier versions of the same interface artifact present in the central repository. If so, the applications associated with the earlier versions of the interface artifact may be updated in step 208 or an alert may be generated.

It may then be determined in step 209 if there are more interface artifacts for the current distributed integration application being deployed. If so, the method 200 may loop or otherwise return to step 203 to determine if the next interface artifact is in the central repository. If not, the method may end in step 210.

In an embodiment in which the interface artifact is in the form of a message model, if the same version of the message model is already in the central repository, then details of the integration application may be stored alongside that message model, otherwise the message model is added. If a previous version of the message model is already in use by a different integration application, then action may be taken to either update integration applications using the previous version to utilize the new version if not functionally different or a warning event may be generated to alert an appropriate user or administrator.

Once data is in the central repository, a user may modify a message model by adding additional metadata, tightening security requirements on a particular field, for instance. In one embodiment, a change to the message model is identified and the list of integration applications using that message model is retrieved along with details of the integration applications. Each integration application may then be analyzed to determine if the change made to the message model will require a reconfiguration of the deployment configuration for the distributed integration application. If no change to the configuration is required, then no action is taken, but if a change is required because the security of a field has been increased to indicate the field value is not to go beyond the company firewall, for example, and part of the integration application acting on that value is deployed to the public cloud environment, then action is taken to move that component of the distributed application within the company firewall and update the secure connections to enable successful end-to-end. processing to continue.

Figure 3:
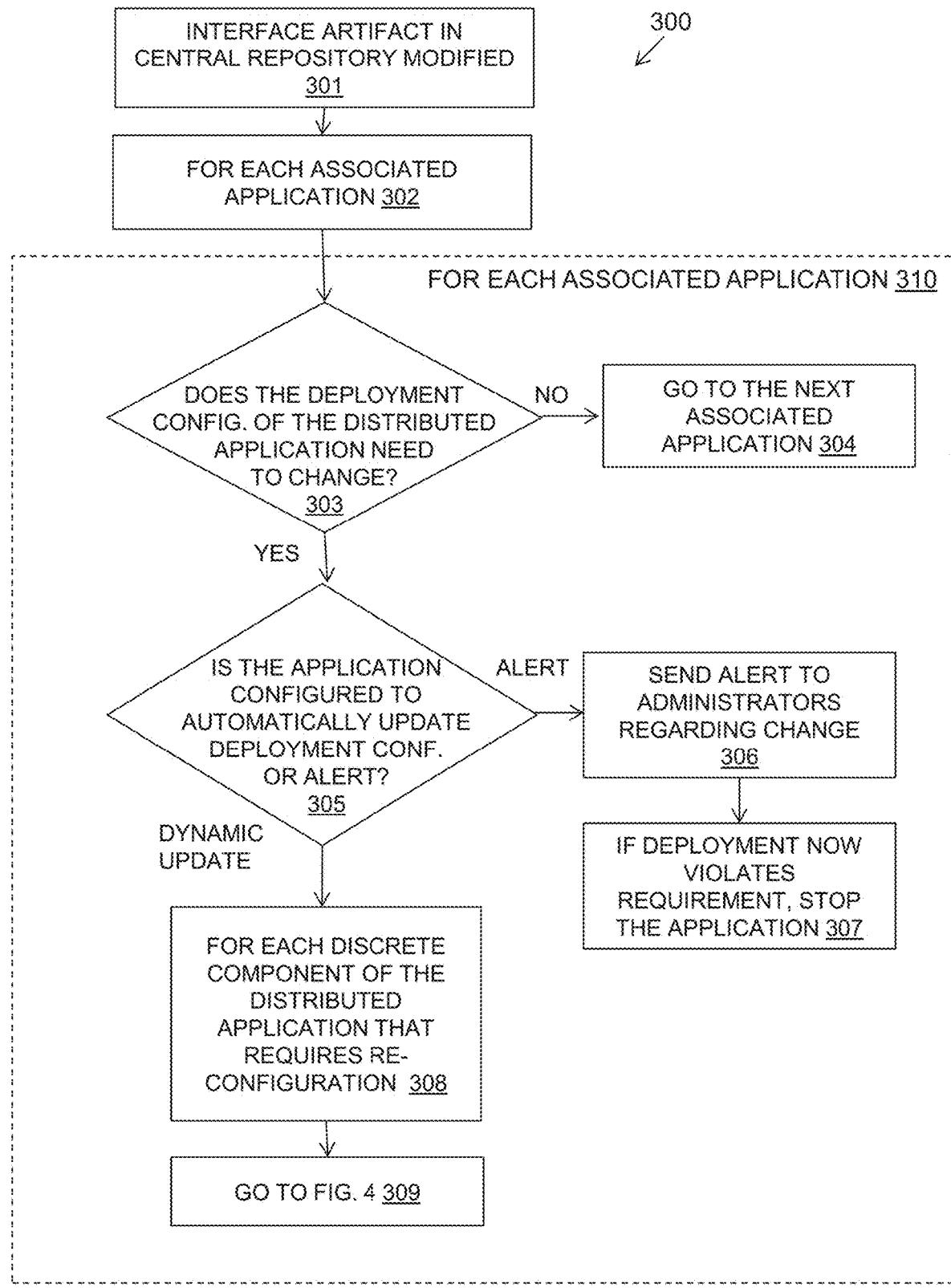
FIG. 3 depicts a flow diagram of an aspect of a method, in accordance with embodiments of the present invention.

FIG. 3 depicts a flow diagram 300 of an aspect of a method, in accordance with embodiments of the present invention. Referring to FIG. 3, a flow diagram 300 shows an example embodiment of an aspect of the described method of updating application resources in the form of interface artifacts of a distributed integration application in a central repository.

An interface artifact referenced in a central repository may be modified or updated in step 301 to change the security requirements of the interface artifact. For each integration application as shown in step 302 associated with the modified interface artifact, the method shown in box 310 may be carried out.

Step 303 may determine if the deployment configuration of the distributed integration application needs to change due to the modification to the interface artifact, which may be determined by checking the deployed locations of processing components of the integration application. The deployed locations may have been provided in the deployed application information stored in the central repository; otherwise, the deployed locations may be checked externally. If the deployment configuration of the distributed application does not need to change, step 304 moves to the next application associated with the modified interface artifact and the method of the box 310 may be carried out for the next application.

If the deployment configuration of the distributed application does need to be changed, step 305 may determine if the application s configured to automatically update the deployment configuration of the application or if an alert should be generated. If an alert should be generated, an alert may be sent in step 306 to administrators regarding the change to the security requirements. If the deployed application violates the modified security requirement, the application may be stopped in step 307. The method 300 may then repeat for a next associated application with the method of box 310 being carried out.

If the application is configured for an automatic, dynamic update, for each discrete component of the distributed integration application that requires reconfiguration a method is carried out in step 308, as shown as step 309 in FIG. 4.

FIG. 4 depicts a flow diagram 400 of an aspect of a method, in accordance with embodiments of the present invention. Referring to FIG. 4, a flow diagram 400 shows an embodiment of an aspect of the described method of updating deployed components of a distributed integration application due to a modification to an interface artifact.

Continuing from FIG. 3, in particular step 309, a method 410 is carried out for each deployed discrete component of the distributed integration application that requires reconfiguration due to the modification to an interface artifact.

The processing of the discrete component may be paused at step 402. The component may be deployed at step 403 to an appropriate location based on the changes to the interface artifact. The connections between the component and connected components may be modified at step 404 to reflect the change. The component may be removed at step 405 from the previous location. The processing may then be resumed at step 406 with the discrete component now in a location that meets the modified security requirements of the interface artifact used by the component.

The method 410 may be repeated for other discrete components in the distributed integration application using the interface artifact.

Figure 5A:
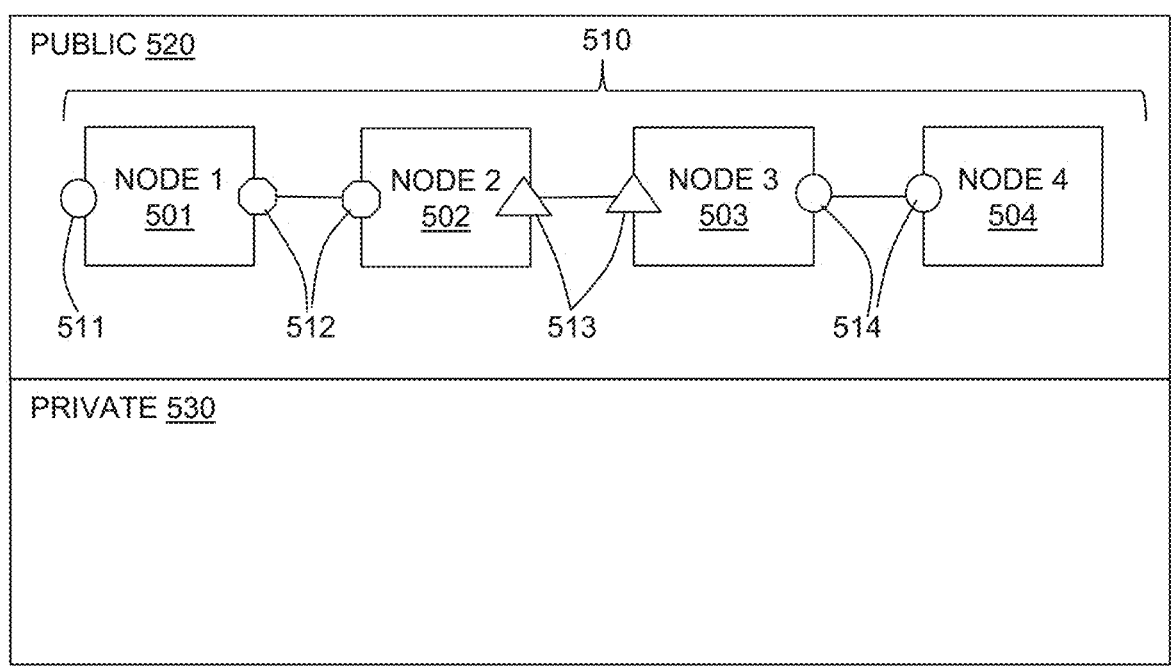
FIG. 5A depicts a first schematic diagram illustrating an implementation of the present invention.
Figure 5B:
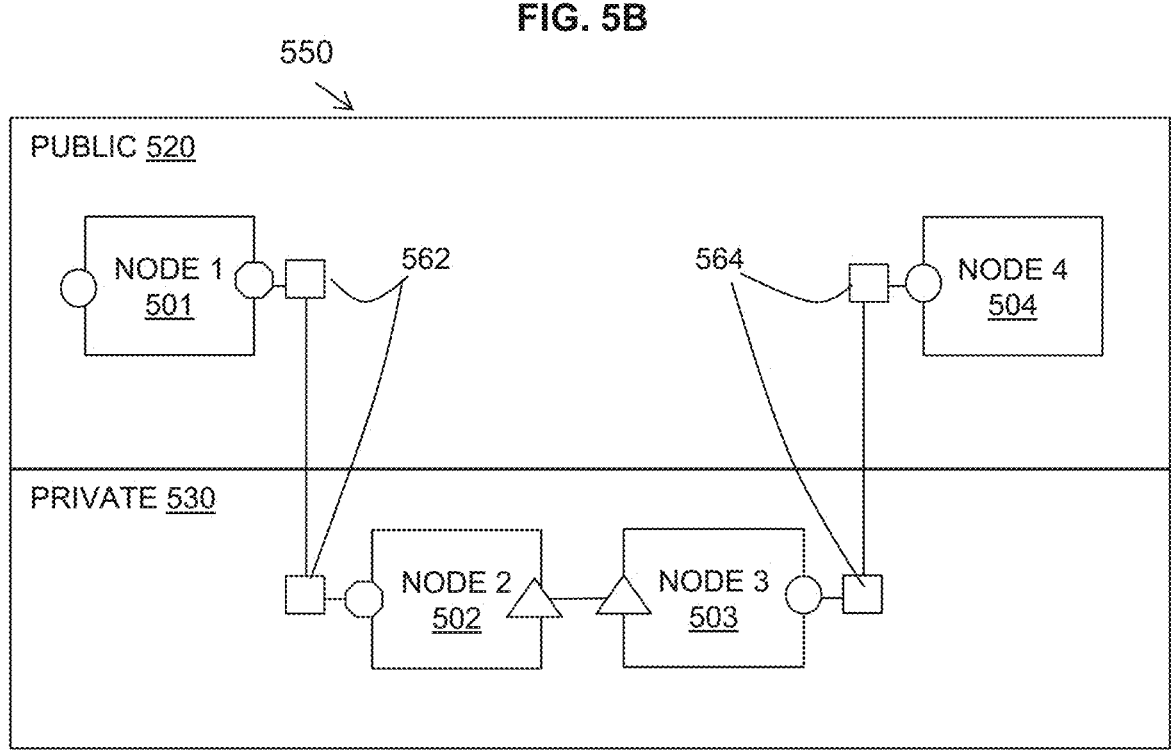
FIG. 5B depicts a second schematic diagram illustrating an implementation of the present invention.

FIG. 5A depicts a first schematic diagram illustrating an implementation of the present invention. FIG. 5B depicts a second schematic diagram illustrating an implementation of the present invention. Referring to FIGS. 5A and 5B, schematic diagrams 500, 550 show components of a distributed application 510 in the form of nodes 1 to 4, depicted respectively by 501-504. The distributed application may be distributed across a public environment 520 and a private environment, for example, on-premise environment 530. Different degrees of security environment may be used by a distributed application and the security requirements may dictate which degree of security is required.

The distributed application has interfaces 511-514 between the nodes 501-504. The interfaces define the transfer of data between the nodes 501-504.

In FIG. 5A, all the interfaces to the separate components contain data that does not have any constraints and is allowed outside of the company firewall. So when the distributed application 510 is deployed, all components are deployed to a less secure public environment 520 and the interface artifacts and application details are stored in a central location as previously described.

The schema for the interface 513 represented by a triangle between node 2 502 and node 3 503 may be modified to state that two fields contain data that is not to leave the company firewall. The update is made to the central repository and the distributed application 510 is identified as associated with that interface artifact. The application is configured to dynamically update. Alternatively, at this point the application may be paused and an alert generated.

The application is analyzed to determine that node 2 502 and node 3 503 utilize the artifact that was updated.

The components represented by the nodes 502, 503 are paused, and because nodes 502, 503 are processing data with increased security requirements, nodes 502, 503 need to be moved to the private environment 530.

FIG. 5B shows that the components of node 2 502 and node 3 503 are deployed to the private environment 530 and the connections of interface 562 between node 1 501 and node 2 502 and interface 564 between node 3 503 and node 4 504 are modified accordingly to insert secure connections. The components of node 2 502 and node 3 503 previously deployed to the public environment are removed and processing is restarted.

Using the described method, distributed applications deployed to hybrid environments may be automatically reconfigured so the distributed applications do not violate restrictions for data processing if utilized artifacts are updated, which provides improved flexibility and scalability in integration solutions.

A resource in the form of an interface may be updated to indicate that a particular element of a message structure has an increased level of security defined, which may trigger a reconfiguration of the deployed application to ensure that processing on the element is performed within an appropriate system, (i.e. on-premise behind a particular firewall).

Figure 6:
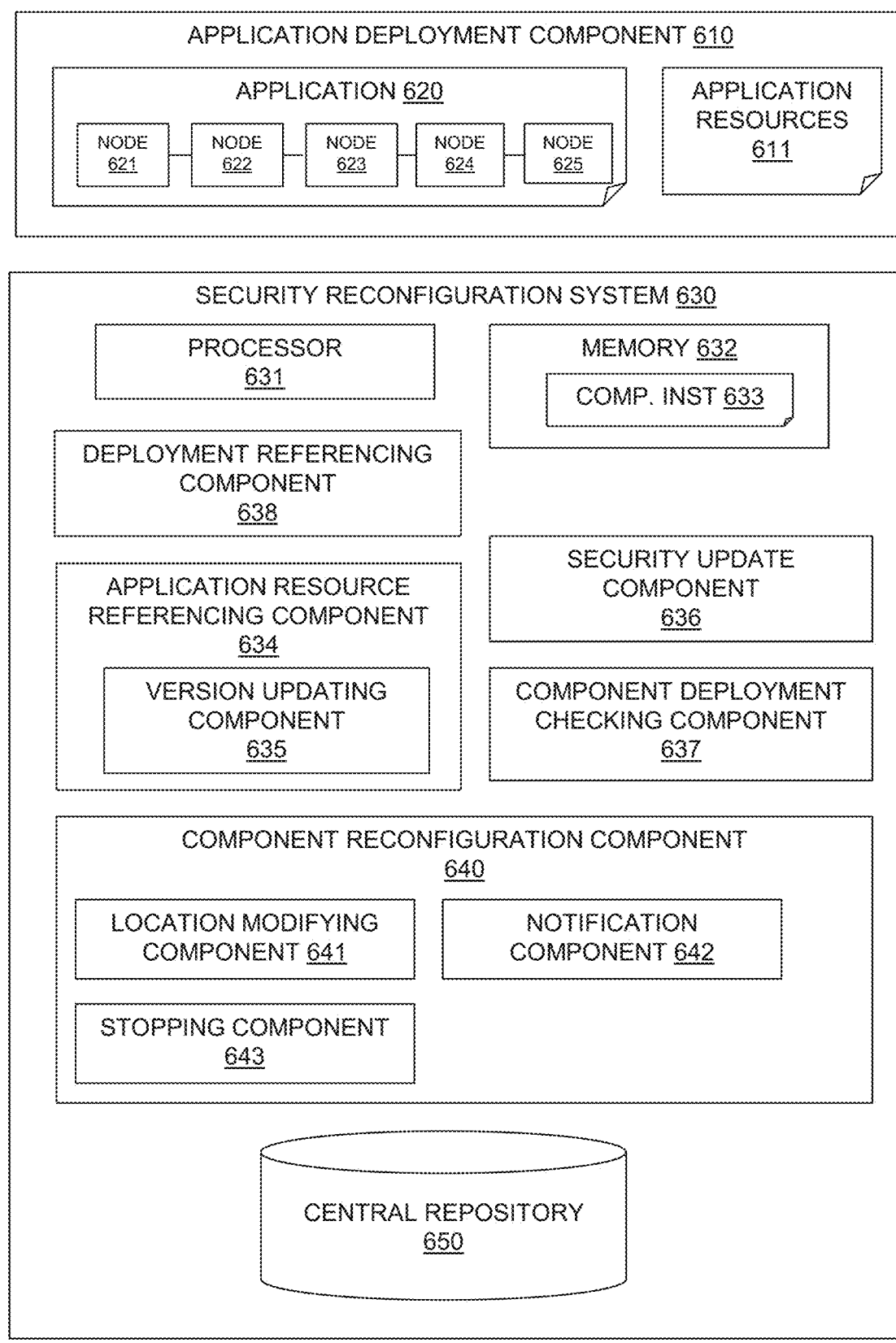
FIG. 6 depicts a block diagram of an embodiment of a system, in accordance with embodiments of the present invention.

FIG. 6 depicts a block diagram of an embodiment of a system 600, in accordance with embodiments of the present invention. The system 600 may include or be used in association with an application deployment component 610 for deploying an application 620 formed of discrete components 621-625 across different locations, for example, in a hybrid cloud environment. The application 620 may reference application resources 611, for example, a message model.

The system 600 may include a security reconfiguration system 630 for storing application resources 611 with mappings to deployed applications 620 utilizing the application resources 611 in a central repository 650. The security reconfiguration system 630 may include a processor 631 and a memory 632 configured to provide computer program instructions 633 to the processor 631 to execute the function of the following components arranged to provide the defined functionality.

The security reconfiguration system 630 provides a central repository 650 for multiple deployed applications and may be implemented as a service for multiple systems deploying applications.

The security reconfiguration system 630 may include a deployment referencing component 638 for referencing an application deployment component 610 to receive information regarding the deployment of an application.

The security reconfiguration system 630 may include an application resource referencing component 634 for adding one or more application resources 611 for a deployed application 620 to the central repository 650 with reference to the deployed application 620 utilizing the resources 611. The application resource referencing component 634 may determine if there is an application resource already in the central repository 650 and, if so, adding the reference to the newly deployed application 620 utilizing the resource.

The application resource referencing component 634 includes adding references to components of the deployed application utilizing the resources and adding information of where components of the deployed application are deployed.

The application resource referencing component 634 may include a version updating component 635 for determining if there is a previous version of an application resource 611 in the central repository 650 and, if so, updating existing applications referencing the previous version and/or generating an alert.

The security reconfiguration system 630 may include a security update component 636 for receiving an update to an application resource 611 to modify a security requirement for the resource 611. The security reconfiguration system 630 may also include a component deployment checking component 637 for checking the deployment location of the components of deployed applications referenced to the updated application resource to ensure the deployed applications conform to the modified security requirement.

The security reconfiguration system 630 may include a component reconfiguration component 640 for taking an action for each component of the entire deployed application that does not conform to the modified security requirement. The component reconfiguration component 640 may include: a location modifying component 641 for modifying the deployment location of the component such that the deployed application now meets the security requirements; a notification component 642 for providing a notification of non-conformity; and a stopping component 643 for stopping the operation of a component that no longer conforms.

The modifying component 641 for modifying the deployment location of the component may deploy the component to a new location based on the updated security requirements and may modify the connections between the components to reflect the change. The modifying component 641 may pause processing of the component during deployment to a new location and may resume processing of the component at the new location.

Figure 7:
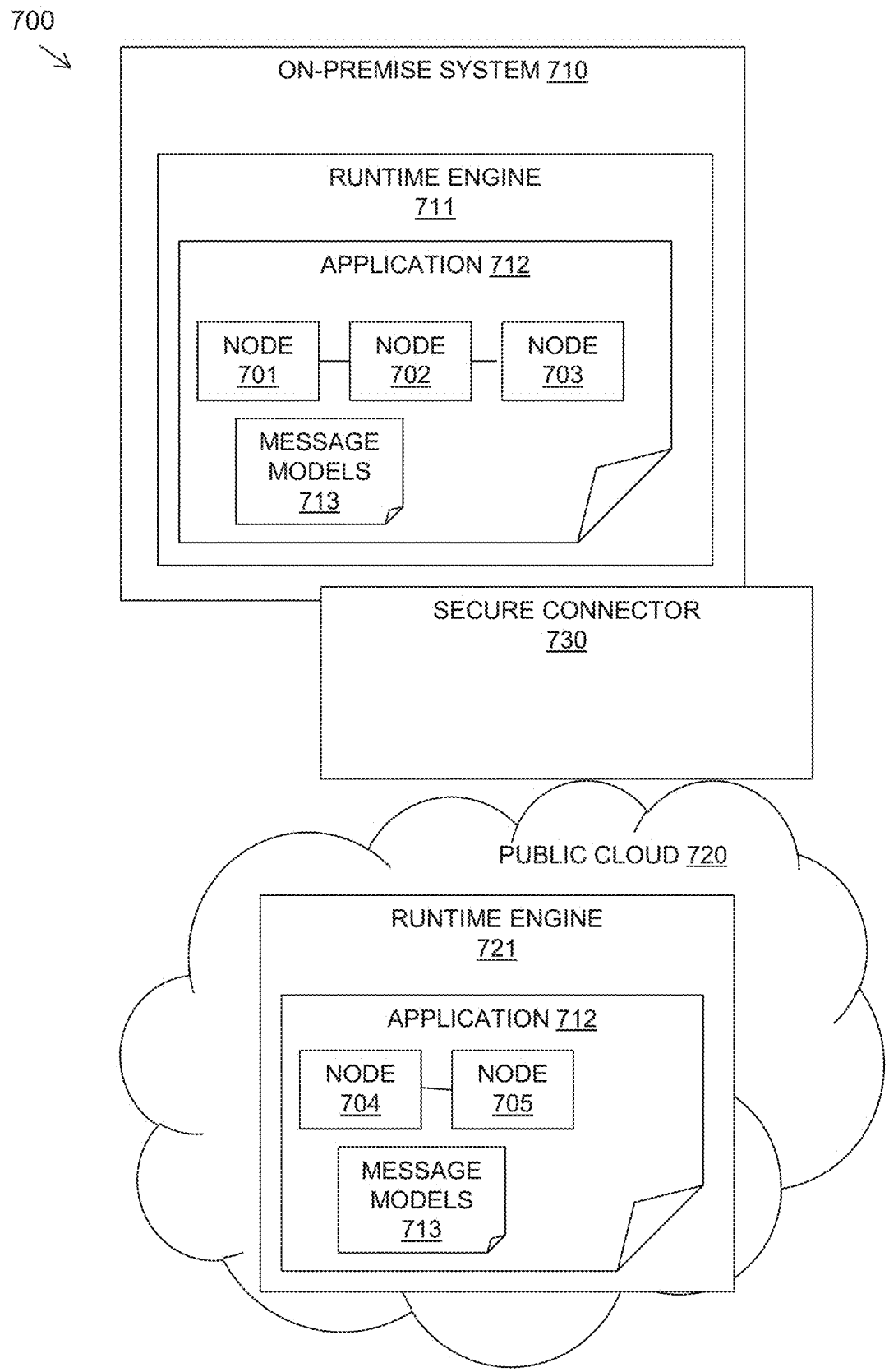
FIG. 7 depicts a block diagram of an embodiment of a hybrid cloud environment in which the present invention may be implemented, in accordance with embodiments of the present invention.

FIG. 7 depicts a block diagram of an embodiment of a hybrid cloud environment in which the present invention may be implemented, in accordance with embodiments of the present invention.

The example environment 700 shown includes an application 712 in the form of an integration application deployed across a hybrid cloud environment. For simplicity of illustration, the hybrid cloud environment is shown as an on-premise system 710 and a public cloud 720.

The on-premise system 710 and the public cloud 720 may have runtime engines 711, 721 respectively. The runtime engines 711, 721 run applications that are deployed to them. In one exemplary embodiment, a runtime engine may be an integration. The application references libraries that may typically contain associated resources, such as message models 713.

The integration application 712 may have processing nodes 701-705 which may be deployed in the on-premise system 710, or the public cloud 720 depending on the security requirements of the processing nodes 701-705 and their interfaces.

Each of the nodes 701-705 may be executed in the runtime engine 711 on-premise or the runtime engine 721 on the public cloud or other locations in a more complex arrangement. When the logic in the application 712 reaches a node 701-705, if the integration application is to be performed on the public cloud 420 then a message and context that is being processed is sent to that runtime engine 721. If the integration application is to be performed on the on-premise system 710, then a message and context that is being processed is sent to the runtime engine 711 on the on-premise system 710.

A secure connector 730 may be provided as a process running in a location on-premise, in the cloud, or split between the two that connects the runtime engine 711 on-premise to the runtime engine 721 in the cloud 720. Once the processing completes in the cloud runtime engine 721 control returns to the on-premise runtime engine 711. So the secure connector 730 is an external process in relation to the runtime engines 711, 721 invoked and connects the on-premise runtime engine 711 to the runtime engine 721 in the cloud.

The described security reconfiguration system 610 of FIG. 6 may be provided to reconfigure processing nodes 701-705 as required following updates to the application resources the processing nodes 701-705 utilize. The reconfiguration may determine which runtime engine 711, 721 a node may be deployed to.

Figure 8:
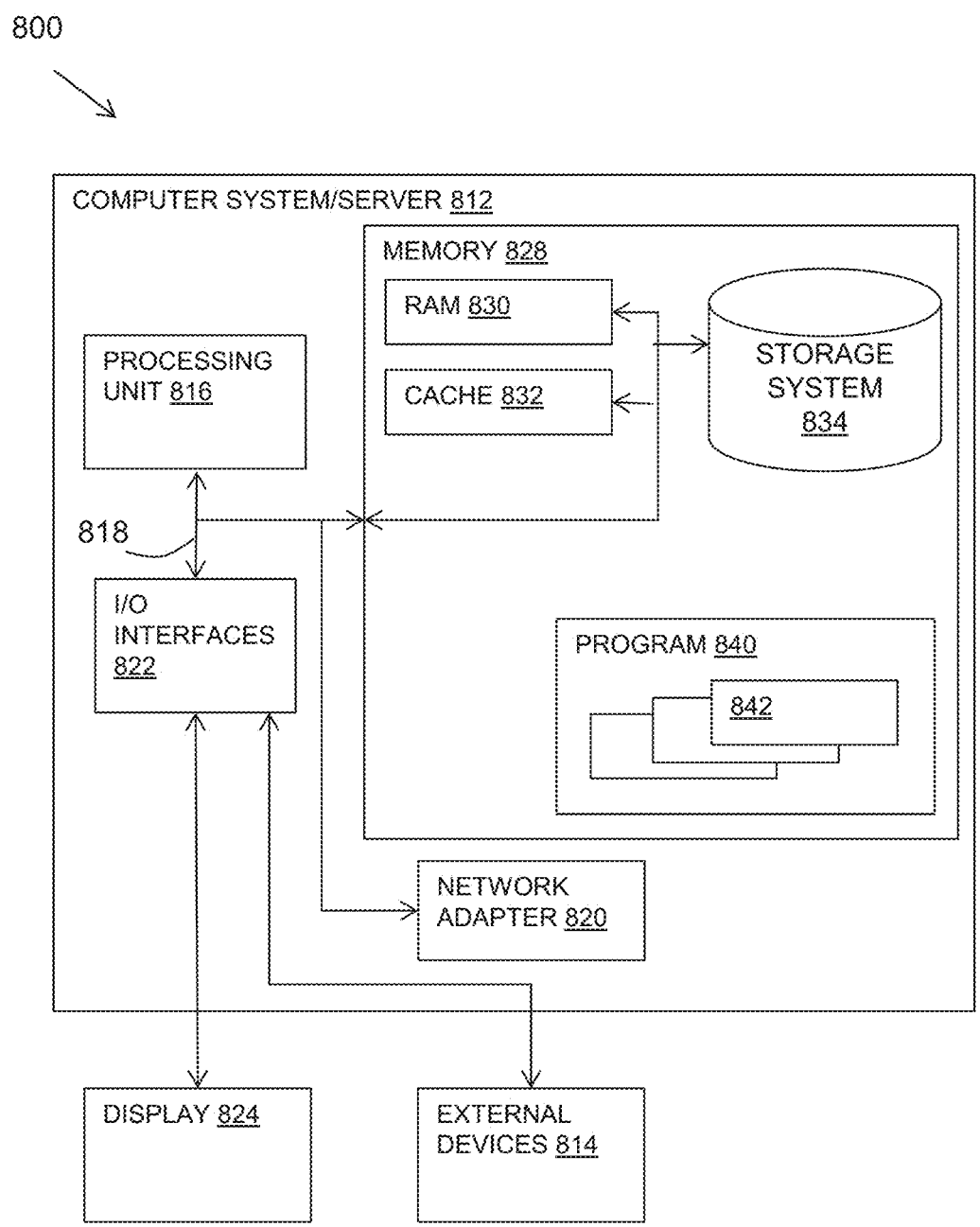
FIG. 8 depicts a block diagram of an embodiment of a computer system or cloud server in which the present invention be implemented, in accordance with embodiments of the present invention.

FIG. 8 depicts a block diagram of an embodiment of a computer system or cloud server in which the present invention may be implemented, in accordance with embodiments of the present invention A computer system or server 812 may be operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

In FIG. 8, a computer system/server 812 is shown in the form of a general-purpose computing device. The components of the computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability as some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service(PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
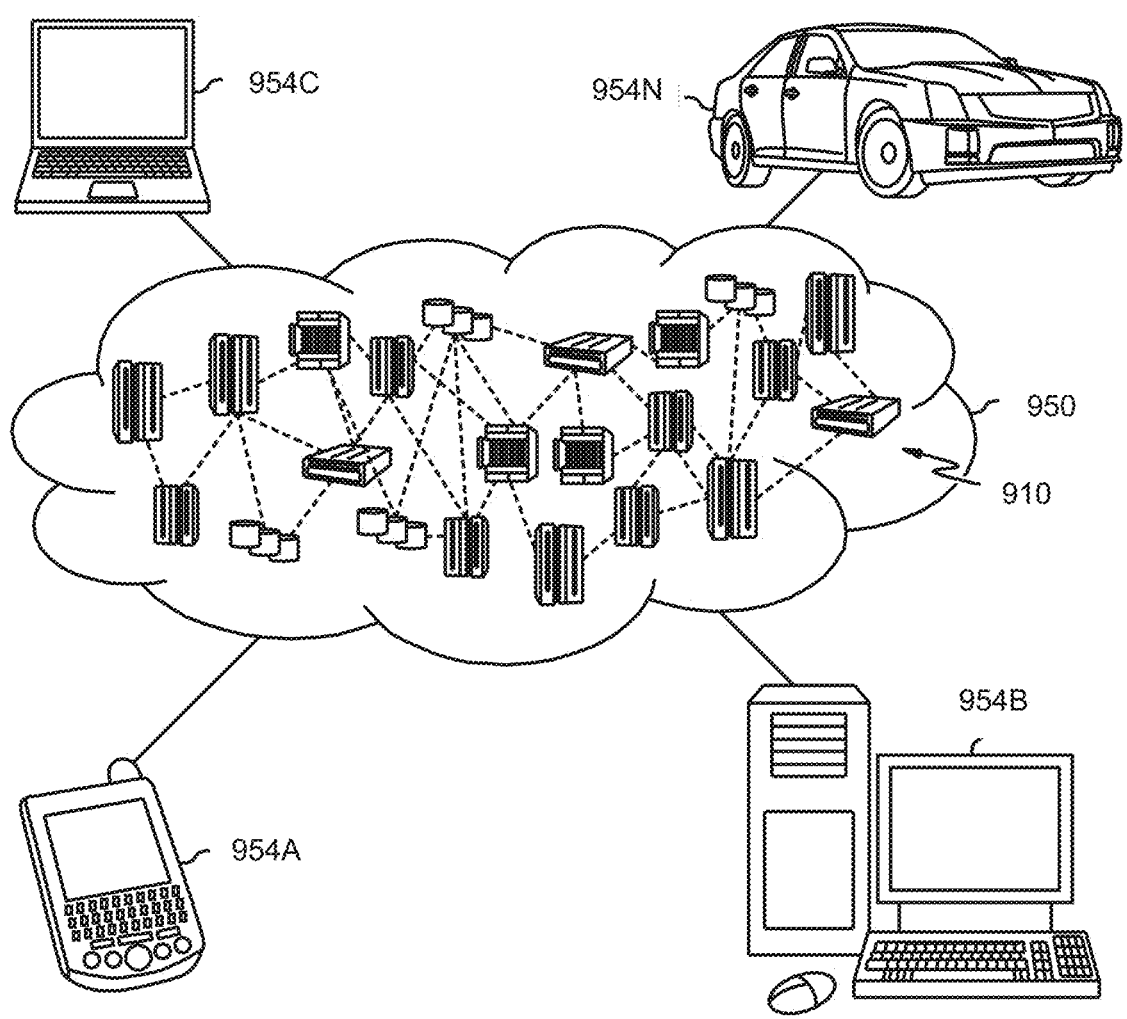
FIG. 9 depicts a schematic diagram of a cloud computing environment in which the present invention may be implemented, in accordance with embodiments of the invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser)

Figure 10:
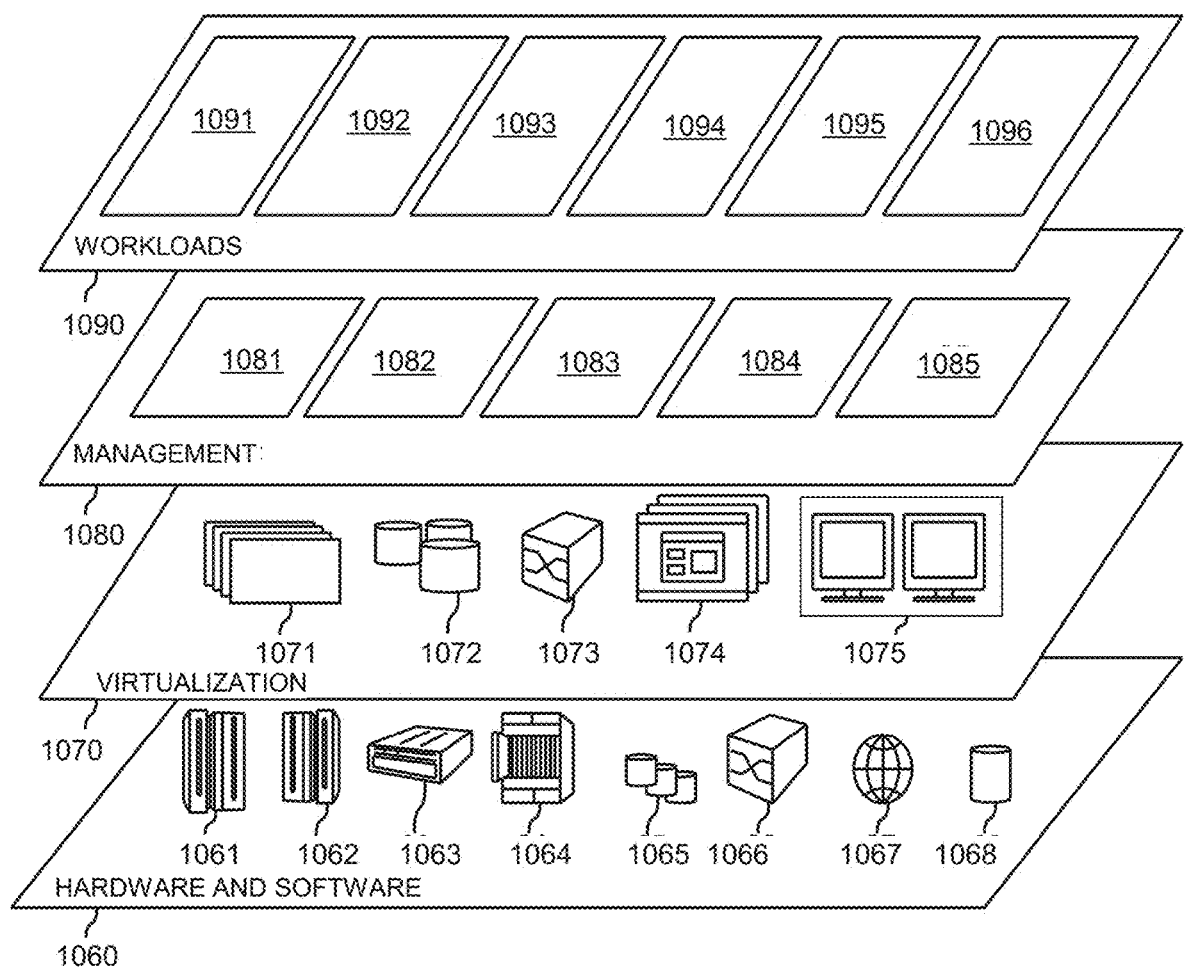
FIG. 10 depicts a diagram of abstraction model layers of a cloud computing environment in which the present invention may be implemented, in accordance with embodiments of the invention.

Referring now to FIG. 10, a set of functional abstraction layers provided by cloud computing environment 950 (FIG. 9) is shown. It should be understood in advance that the components, layers, and functions shown in FIG-, 10 are intended to be illustrative only and embodiments of the invention are not limited thereto. As depicted, the following layers and corresponding functions are provided.

Hardware and software layer 1060 includes hardware and software components. Examples of hardware components include: mainframes 1061; RISC (Reduced instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and secure deployment processing 1096.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reconfiguration of security requirements for deployed components of applications, comprising:

referencing, by a processor of a computing system, a deployed application wherein the deployed application is divided into processing components which can be deployed in different locations in a hybrid cloud environment comprising a public environment and an on-premise environment that is behind a firewall;

adding, by the processor, one or more application resources for the deployed application to a central repository with references to the processing components of the deployed application utilizing the one or more application resources, wherein at least one of the one or more application resources is an interface artifact, wherein the interface artifact is at least one of a schema, a message model, an interface document defining a Representational State Transfer (REST) endpoint, Web Service Definition Language (WSDL) defining a Simple Object Access Protocol (SOAP) endpoint, and an application specific policy document that provides configuration options;

receiving, by the processor, an update to an application resource of the one or more application resources stored in the central repository based on a change to the application resource made by a user modifying a security requirement for the application resource;

checking, by the processor, the deployment locations within the hybrid cloud environment of the processing components of the deployed application referenced to the updated application resource to ensure the deployed application conforms to the modified security requirement; and taking, by the processor, an action for each referenced processing component of the deployed application that does not conform to the modified security requirement, wherein the action includes modifying the deployment location of a processing component within the hybrid cloud environment, such that the processing component meets the modified security requirements;

wherein modifying the deployment location of the processing component includes removing the processing component originally deployed on the public environment and deploying the processing component to the on-premise environment based on the modified security requirements that requires a tightened security requirement, made by updating the application resource stored on the central repository; further wherein the connections between the processing component and other processing components are updated to enable successful end-to-end processing to continue.

2. The method as claimed in claim 1, wherein the references to the processing components of the deployed application include a reference to an entire deployed application.

3. The method as claimed in claim 1, wherein the security requirement for the resource defines allowable deployment locations for resource data, and checking the deployment locations ensures conformity to the security requirement for the resource data each processing component is processing.

4. The method as claimed in claim 1, wherein modifying the deployment location of the processing component includes pausing processing of the processing component during deployment to a new location and resuming processing of the processing component at the new location.

5. The method as claimed in claim 1, wherein adding one or more application resources for the deployed application to the central repository includes references to processing components of the deployed application utilizing the resources with information of where the processing components of the deployed application are deployed; and wherein checking the deployment locations of the processing components of deployed applications includes checking the information of where processing components are deployed.

6. The method as claimed in claim 1, wherein adding one or more application resources for the deployed application to the central repository, includes determining if an application resource is already in the central repository and, if so, adding the references to the processing components of the deployed application utilizing the application resource.

7. The method as claimed in claim 1, wherein adding one or more application resources for the deployed application to the central repository, includes determining if there is a previous version of an application resource in the central repository and, if so, updating existing applications referencing the previous version and/or generating an alert.

8. A computer program product, comprising a computer readable hardware storage device storing a computer readable program code, the computer readable program code comprising an algorithm that when executed by a computer processor of a computing system implements a method for reconfiguring security requirements for deployed components of applications, the method comprising:

referencing, by a processor of a computing system, a deployed application wherein the deployed application is divided into processing components which can be deployed in different locations of a hybrid cloud environment comprising a public environment and an on-premise environment that is behind a firewall;

adding, by the processor, one or more application resources for the deployed application to a central repository with references to the processing components of the deployed application utilizing the one or more application resources, wherein at least one of the one or more application resources is an interface artifact, wherein the interface artifact is at least one of a schema, a message model, an interface document defining a Representational State Transfer (REST) endpoint, Web Service Definition Language (WSDL) defining a Simple Object Access Protocol (SOAP) endpoint, and an application specific policy document that provides configuration options;

receiving, by the processor, an update to an application resource of the one or more application resources stored in the central repository based on a change to the application resource made by a user modifying a security requirement for the application resource;

checking, by the processor, the deployment locations of the processing components of the deployed application referenced to the updated application resource to ensure the deployed application conform to the modified security requirement; and taking, by the processor, an action for each referenced processing component of the deployed application that does not conform to the modified security requirement, wherein the action includes modifying the deployment location of a processing component within the hybrid cloud environment, such that the processing component meets the modified security requirements; wherein modifying the deployment location of the processing component includes removing the processing component originally deployed on the public environment and deploying the processing component to the on-premise environment based on the modified security requirements that requires a tightened security requirement, made by updating the application resource stored on the central repository; further wherein the connections between the processing component and other processing components are updated to enable successful end-to-end processing to continue.

9. A computer system, comprising:

a processor;

a memory device coupled to the processor; and a computer readable storage device coupled to the processor, wherein the storage device contains program code executable by the processor via the memory device to implement a method for reconfiguring security requirements for delayed components of applications, the method comprising:

referencing, by a processor of a computing system, a deployed application wherein the deployed application is divided into processing components which can be deployed in different locations of a hybrid cloud environment comprising a public environment and an on-premise environment that is behind a firewall;

adding, by the processor, one or more application resources for the deployed application to a central repository with references to the processing components of the deployed application utilizing the one or more application resources, wherein at least one of the one or more application resources is an interface artifact, wherein the interface artifact is at least one of a schema, a message model, an interface document defining a Representational State Transfer (REST) endpoint, Web Service Definition Language (WSDL) defining a Simple Object Access Protocol (SOAP) endpoint, and an application specific policy document that provides configuration options;

receiving, by the processor, an update to an application resource of the one or more application resources stored in the central repository based on a change to the application resource made by a user modifying a security requirement for the application resource;

checking, by the processor, the deployment locations of the processing components of the deployed application referenced to the updated application resource to ensure the deployed application conform to the modified security requirement; and taking, by the processor, an action for each referenced processing component of the deployed application that does not conform to the modified security requirement, wherein the action includes modifying the deployment location of a processing component within the hybrid cloud environment, such that the processing component meets the modified security requirements;

wherein modifying the deployment location of the processing component includes removing the processing component originally deployed on the public environment and deploying the processing component to the on-premise environment based on the modified security requirements that requires a tightened security requirement, made by updating the application resource stored on the central repository; further wherein the connections between the processing component and other processing components are updated to enable successful end-to-end processing to continue.

10. The system as claimed in claim 9, wherein modifying the deployment location of a processing component is for pausing processing of the processing component during deployment to a new location and resuming processing of the processing component at the new location.

11. The system as claimed in claim 9, wherein adding one or more application resources for the deployed application to a central repository includes references to processing components of the deployed application utilizing the resources with information of where components of the processing components of the deployed application are deployed; and wherein checking the deployment location of the processing components of deployed applications includes checking the information of where processing components are deployed.

12. The system as claimed in claim 9, wherein adding one or more application resources for the deployed application to a central repository, includes determining if an application resource is already in the central repository and, if so, adding the references to the processing components of the deployed application utilizing the application resource.

13. The system as claimed in claim 9, wherein adding one or more application resources for the deployed application to a central repository includes determining if there is a previous version of an application resource in the central repository and, if so, updating existing applications referencing the previous version and/or generating an alert.

* * * * *